United States Patent Office 3,689,251
Patented Sept. 5, 1972

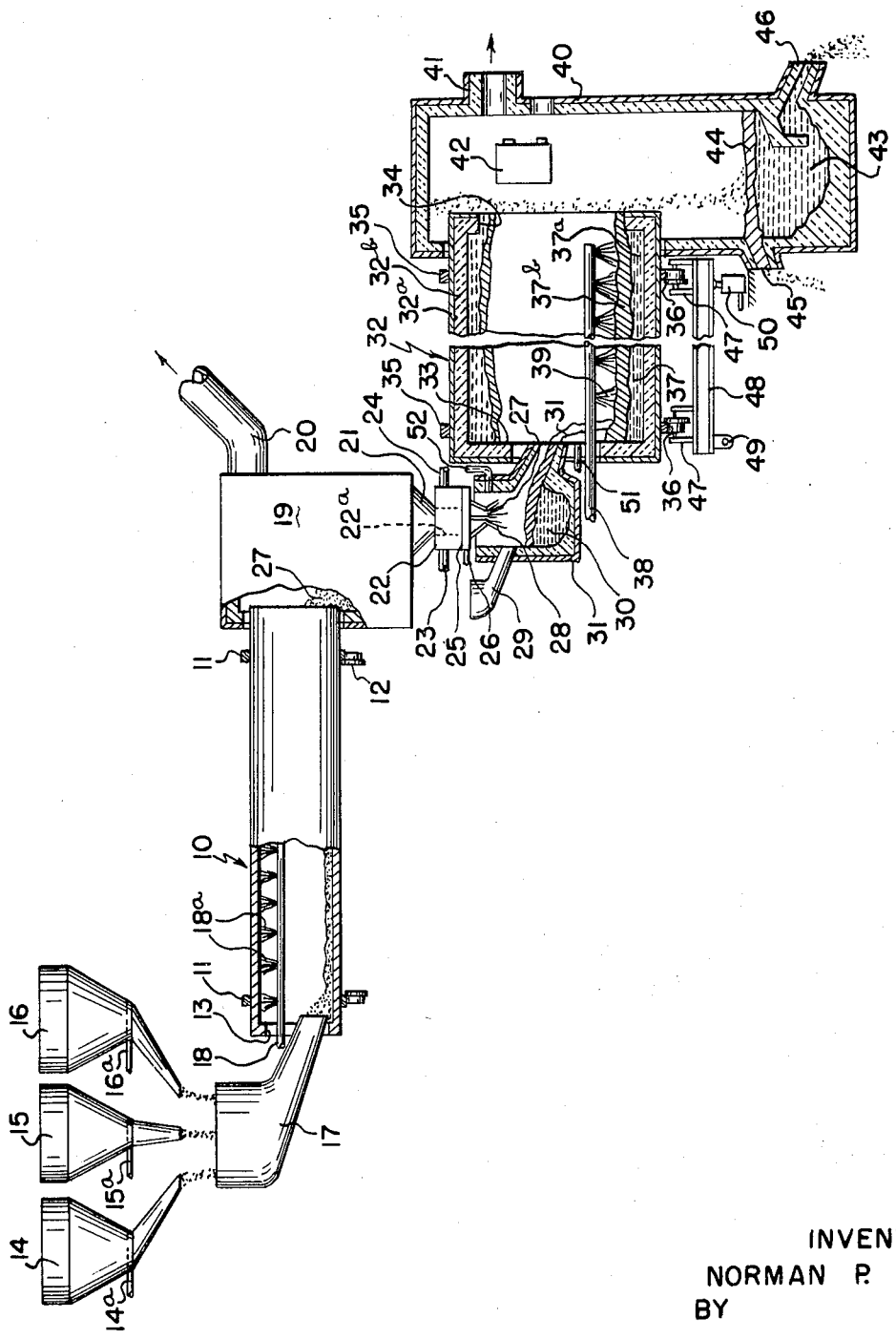

3,689,251
REDUCTION OF SOLID IRON ORE TO HOT METALLIC IRON IN A ROTARY KILN-FLASH HEATER-ROTARY REACTOR COMPLEX
Norman P. Goss, Mentor, Ohio, assignor of a fractional part interest to Arthur K. Blough, East Sparta, Ohio
Filed July 9, 1970, Ser. No. 53,575
Int. Cl. C21b 13/14, 13/08; C21c 5/56
U.S. Cl. 75—39      4 Claims

ABSTRACT OF THE DISCLOSURE

A method is disclosed of reducing solid iron ore particles to hot metallic iron in a continuous system involving a rotary kiln and a flash heater and a rotary reactor in series. Iron ore particles, suitable fluxes for removing impurities from iron, and solid fuel particles are fed in a continuous stream of small volume through this apparatus complex with the operation so controlled that the iron oxide is reduced step by step as it passes through the series of apparatus elements, with the temperature and chemistry properly controlled at each step so that the end product discharged from the rotary reactor is molten iron carburized to about three or four percent carbon. The invention makes it possible to utilize relatively inexpensive equipment, of modest dimensions, and capable of simple maintenance, while producing a carefully controlled end product.

---

The object of the present invention is to provide a combination of apparatus, the individual elements of which are more or less known in the metallurgical industries, but combining these apparatus elements and controlling the same in a novel fashion so as to break down the reduction of the iron oxides of a starting material which is iron ore particles to provide an end product which is hot metallic iron, so as not to overload any individual piece of apparatus and to render practical the handling of large volumes of CO and $CO_2$ gases, and B.t.u.'s required.

Other objects and advantages of this invention will be apparent from the accompanying drawing and specification and the essential features thereof will be set forth in the appended claims.

The drawing shows the combination in series of a rotary kiln, a flash heater and a rotary reactor connected together in a fashion to carry out the present invention. The drawing is broken away in parts to more clearly show the construction and operation of the apparatus.

Continuous processing is possible now in steel making to lower labor, fuel, material and handling costs while improving quality. This can lower capital expenditures per annual ton of production because smaller units, smaller and lower buildings, and smaller capacity lifting cranes can be used, and in-plant transportation facilities may be eliminated.

The improved continuous iron making process of this invention will reduce handling and rehandling operations to a minimum. The ever increasing cost of handling equipment and its maintenance, and of labor, makes such a process of continuous iron making more and more attractive. The technology has been developed to a point where such a process is entirely feasible.

The improved iron making process of this invention provides a minimum flow of material in the system. This makes it possible to change the chemical composition of the end product without difficulty. In the system of this invention, better control of iron composition is possible and much more precise than previously known.

Other advantages of this invention are the possibilities of complete shutdown, repairs and rapid start-up. Such a system operates economically over a wide range of productive capacity. As demand for added tonnage increases, more lines of production according to this invention could be added, as the major parts thereof are relatively low cost items.

In the continuous iron making system of this invention, the refractories best suited for each step of the operation can be fully utilized, the more costly refractories being used only where severe erosion and temperature conditions exist. In a well designed continuous system embodying the present invention, less refractories are required than in the presently known B.O.F.-blast furnace complex. In a well designed continuous iron making system, utilizing the present invention, discharge of fumes into the atmosphere can be greatly reduced, since only small volumes of metal are being processed per unit of time, and this will be increasingly important in the near future to reduce air pollution.

Perhaps the greatest advantage of the system herein proposed is the use of cheaper and a wide range of fuels, as well as ores of lower cost, especially ores not usable in the blast furnace.

It should be kept in mind that a reducing atmospheric condition must be maintained throughout the system about to be described.

The first unit used in the present invention is a rotary kiln. It is a refractory lined cylinder provided with a dam at the inlet end to control the depth of charge. The cylinder is rotated about its axis at slow speed, sometimes as low as two to three revolutions per minute. The drawing shows a rotary kiln 10 having annular bands 11 fixed thereto at opposite ends, the same resting upon drive rollers 12 which are suitably mounted and driven by power means in a manner well known in the art. The kiln is a hollow cylinder with a radially inwardly extending dam 13 at the inlet end thereof. Suitable feed hoppers are shown at 14, 15 and 16 to provide the desired charge for the rotary kiln, the same being fed through a feeding chute 17. For instance, hopper 14 will feed finely divided coal or coke particles, hopper 15 supplies iron ore particles, preferably beneficiated ores, and hopper 16 would provide suitable flux materials commonly used to remove impurities from iron such as lime, $CaF_2$ and $Al_2O_3$, and others, although added flux may be supplied at 29, if desired, as later described. Suitable control means is provided at the discharge from each feed hopper as indicated at 14a, 15a and 16a, respectively. This control means is used to provide the desired mixture of fuel, ore and flux which, of course, can be changed from time to time to vary the mix as desired. The heating lance 18, or a plurality thereof, is provided with jets 18a directed outwardly. The rotary kiln 10 is rotated slowly and the heating jets, as shown, will heat the roof to a temperature above 2100° F. and the hot refractory passes beneath the fuel and ore and flux lying on the floor of the kiln and being mixed there while the heat and carbon cause reduction of FeO to Fe. Additional heating means may be added to heat the charge directly if so required. The jets 18a may be directed downwardly into the charge, if desired. The ingredients are controlled to maintain a temperature between about 1800° F. and 2100° F. in the kiln 10. Excess fuel is maintained and this, with the CO gas produced, causes a reducing atmosphere in the kiln. The kiln 10 is inclined slightly toward its discharge end to cause the charge to flow to the exit end in a continuous shallow stream along the bottom of the kiln. The jets 18a use oxygen with added fuel, if required, to cause combustion of the fuel and reduction of the ore. The materials are so controlled, and the temperatures are so arranged, as to cause a reduction of between 40 and 75 percent of the iron oxides to iron in the kiln 10, a 40 to 60 percent reduction being preferred depending on the core. A maximum temperature of the charge at the exit end of kiln 10, toward the right in the drawing, is 2100° F., or any temperature below the sintering point which may be between 2000° F. and 2250° F. depending on the ore.

A receiving chamber 19 which is also lined with a suitable refractory surrounds the discharge end of the kiln 10. An outlet flue 20 for CO and $CO_2$ gas is provided near the upper end of this chamber 19. It should be understood that in reducing iron ore to one ton of molten iron, about 20,000 cubic feet of gas is generated which is mostly carbon monoxide although some carbon dioxide is also produced. One of the advantages of the present invention is that the CO gas is produced in a plurality of steps in the apparatus of this invention so that it is more easily handled. This three-step feature also makes it possible to handle efficiently the 14,000 B.t.u.'s involved in producing one ton of hot metal.

The stream passing through the chamber 19 is discharged through a funnel outlet 21 through a water cooled ring 22, through which water is circulated at 23 and 24. Beneath the ring 22, and cooled by engagement therewith, is a multi-opening gas injection ring 25 which has a central through opening in line with a central through opening 22a in the ring 22. Oxygen, or a suitable gas mixture (fuel plus oxygen) is supplied at 26 to the ring 25 and a plurality of inwardly and downwardly directed heating jets 27 impinge against the axially flowing stream of partially reduced and heated material 28 which comes from the discharge of the kiln 10 and passes through the flash heater. The partially reduced ore, $Fe_2O_3$ and FeO, excess fuel, including coal fines, and flux in the stream 28 react in the flash heater and are heated rapidly to 2350° F. or more, at the same time reducing more FeO, and effecting some carburization of the iron present. If required, excess CO gas may be withdrawn at outlet 52 and transferred for in-plant use, or in the system itself. Additional coal or coke or flux or iron ore can be added through the chute 29 if necessary, since a reducing atmosphere must be assured and additional ore, if necessary, to leave no excess of either FeO or coal to discharge from reactor 32. The stream 28 and the products of combustion, which are reducing, pass downwardly against the surface of the molten iron and charge 30 lying in the bottom of the flash heater reservoir 31. The result is that the flash heater 25, 31 boosts the temperature of the travelling stream 28 to a temperature between 2350° F. and 2500° F. At the same time, the iron oxides in the stream are further reduced as the charge is discharged from the end of the kiln 10 so that less than 30 percent iron oxide remains as the charge enters the rotary reactor 32, between 20 percent and 30 percent being preferred.

In the jet booster or flash heater, oxygen gas, in the presence of excess coal fines at 2000° F. may be sufficient to produce a reducing atmosphere to continue reduction of FeO to Fe. However, if required, CO gas (generated in the system herein described) or gas from a natural gas line, may be injected into the flash heater by a line from 52 to a point adjacent stream 28. This quick heating and exposure to a reducing atmosphere is an essential requirement. The main function of the flash heater is to heat the partially reduced ore, from 2100° F. or less to 2350° F. to 2500° F., under completely reducing conditions, and with a little more reduction of FeO to Fe plus some carburization.

The amount of metal in the flash heater is held as small as possible. For instance, in a system producing but 500 pounds per minute, not more than 100 pounds to 200 pounds would be held here. As the output of the reactor system is increased, more would be retained in the flash heater. Experience has shown that by keeping the flash heater small, efficient operation and long life is possible.

Past experience has shown that the rotary kiln or flash heater as known in the prior art by themselves were never satisfactory to effectively reduce ore to metallic iron, conserve CO gas and utilize heat required or produced in an efficient manner.

By combining the kiln and flash heater with the rotary reactor, where retention time is under complete control, so that the FeO is completely used and the coke or coal fines completely utilized, a hot metal can be produced in the most efficient manner and in the shortest time possible, at the same time obtaining a uniform product of high quality.

The stream 31 discharging from the flash heater falls into the inlet end of a rotary reactor 32. This reactor is like that described and claimed in U.S. Pat. No. 2,866,-703, granted Dec. 30, 1958 to Norman P. Goss, and comprises a hollow cylinder consisting of a steel shell 32a and a refractory lining 32b having a radially inwardly extending dam 33 at the inlet end and a shallower radially inwardly extending dam 34 at the discharge end to control the depth of the layer of treated material within the reactor. The reactor is equipped with annular bands 35 near opposite ends thereof which rest upon support and drive rollers 36 which are provided with drive means, not shown, capable of driving the reactor at sufficient speed to create gravitational forces inside the reactor exceeding 6.0 to 6.5 G's. This causes the molten mixture to completely coat the radially inner surface of the reactor as shown at 37 with layers of molten iron and slag. Due to the difference in specific gravity, the heavier molten iron provides a layer 37a against the refractory lining 32b while the lighter slag forms a layer 37b radially inward of the layer 37a. Thus, the pure iron, or substantially so, lies against the refractory 32b and protects the same against excessive erosion. One or more oxygen lances is provided as shown at 38, here shown as nearer the bottom of the reactor and causing a plurality of oxygen jets 39 to drive outwardly, even against the roof, causing a turbulent mixture of the charge from the flash heater including inner layer 37b containing flux and the outer molten layer 37a of metal whereby to increase the removal of impurities and complete the reduction of FeO.

An extra oxygen jet or injection lance may be provided striking the inlet stream 31 where it enters the reactor 32 whereby the pre-reduced charge is intimately mixed and additional pre-heat and reduction is supplied. This jet 51 is an added control for chemistry and temperature. It prevents "skulling" at the entrance to the reactor and, by keeping FeO away from dam 33, minimizes erosion there. The lance 51 may be turned off and on as desired.

Under the arrangement shown, the rotary reactor is only required to reduce less than 30 percent of the FeO to Fe and to complete the carburization of the metal. Since the retention time in the rotary reactor can be precisely controlled, exacting control of the chemistry and temperature is possible with complete utilization of the ore, fuel and flux. Here the mixture of flux, coal fines or fuel, FeO and Fe flows in a continuous shallow stream form under supergravitational forces in a generally helical path along the radially inner surface of the cylindrical reactor 32 from the inlet end thereof to the discharge end which is the equivalent of providing an excessively long runner in which to treat the iron oxide with slag components. The ingredients are so arranged that the temperature of the stream in the rotary reactor is held in the range 2400° F. to 2800° F. The lower temperature is desirable as it produces cleaner metal and greatly increases the life of the refractory lining 32b. The CO gas and fuel must be such as to produce a reducing atmosphere in the reactor 32. The iron produced in the rotary reactor shown at 32 is cleaner than in the case of known processes because of closely controlled time and temperature and atmosphere, and because the long helical path of travel permits the flux to lower the phosphorus and silicon in the iron to an unusually low level. The iron at discharge has a composition between three percent and four percent carbon. The reactor speed and tilt provide control for exact composition of the iron at discharge.

The discharge from the right-hand end of the rotary reactor 32 is into a generally enclosed tower 40 having a suitable refractory lining. Near the upper end of this tower is an outlet for CO gas 41 produced in the rotary reactor when $FeO+CO \rightarrow Fe+CO$. If desired, a scrap door 42 may be provided to feed additional scrap metal for increasing the production of molten iron. In the base of the tower, the molten iron collects at the bottom as shown at 43 while the slag floats on top at 44 and is removed continuously. The slag may be removed through the slag notch 45 and the molten iron may be led off at 46. Those skilled in this art will understood that the molten iron at 46 may be held in a mixer for further use, or it may be directed to a pig machine or to an electric furnace. If the continuous process is to be continued, then the molten iron at 46 may be led into one or more additional rotary reactors to produce steel as taught in Goss U.S. Pats. Nos. 2,866,703 and 3,303,018.

If desired, the reactor 32 may be mounted in such a manner as to permit the intermittent tilting of the reactor to raise the discharge end relative to its inlet end. For this purpose, the rollers 36 may be mounted as shown on brackets 47 carried by a beam structure 48 having a fixed pivot 49 below the inlet end of the reactor. Near the discharge end of the reactor, a cylinder and piston motor 50 is mounted on a suitable base and has its piston rod connected to the beam structure 48 so that manipulation of the motor 50 will cause the desired change of level at the discharge end of the reactor. This may be necessary from time to time to aid the mixing action within the reactor and to add additional control to retention time, and to prevent skulling at the entrance end of the reactor, and to even out the heat distribution of the charge.

It is evident that while the refractory lining 32a is subjected to little erosion, the exit end is somewhat exposed. The dam 34 which controls the depth of the bath in the rotary reactor will be subject to some erosion. However, it is possible to rebuild this dam periodically by gunning a suitable plastic refractory within the dam area to compensate for the erosion. This is easily done by cutting the metal supply in the rotary reactor while injecting castable refractory into the dam area, thereby rebuilding it. This maintains the optimum depth of charge 37 in the reactor Because the product discharged from this reactor is hot metal, and not steel, a limited use of expensive refractory in the reactor 32 is possible. About one foot inward from both the inlet and discharge end the slag line is exposed and the layer of molten iron 37a does not always protect the refractory. Therefore, these zones are preferably lined with silicon carbide refractory, whereas the intermediate portion may be lined with ordinary firebrick.

It should be understood that this invention might be combined with a hot blast cupola for melting scrap which might be discharged into the flash heater reservoir 31 to combine with the pool 30, or into tower 40 to combine with pool 43, so that one would have the flexibility of choosing any percentage from 100 percent scrap to 100 percent ore depending upon the price of scrap.

Good control of chemistry and temperature is provided by use of this system. Chemistry may be modified at 14, 15, 16 as to ingredients; at 14a, 15a, 16a as to relative amounts; at 18a as to amounts and composition of gases used; at 26 and 52 as to amounts and composition of gases; at 29 by addition of ore, coal and flux; at 32 by size and speed of rotation of the reactor to vary retention time; at 33 and 34 to vary the depth of bath 37 by tilting at 50 to vary retention time at 39 to vary number of jets and composition of gases; and at 51 by non-use or use and by variations of gases used. Temperature may be controlled at 18a, 26 and 52, 39, 51, and by control of reactor 32.

The control by additions at chute 29 is important. The optimum condition is to have the ore and the carbonaceous fuel completely used up at the discharge from reactor 32. If the ore is in excess, then ore is wasted. If coal, or coke, is in excess, then iron is obtained which, at low temperature, is in sponge or pastry form and hard to handle. With excess coal, the iron obtained, if at higher temperature, will reduce phosphorus giving an impure metal. By adding ore or coal at 29, as required, no excess of either will be discharged from reactor 32.

The system of this invention is synergistic in that the cooperative action of the kiln plus flash heater plus reactor is such that the total effect is greater than the sum of their independent effects taken separately.

What is claimed is:

1. The method of reducing solid iron ore particles to hot metallic iron in a continuous system in three stages including in sequence a rotary kiln, a flash heater and a rotary reactor, comprising feeding to an inlet end of a generally horizontal cylindrical rotary kiln a controlled mixture of iron ore and a solid carbonaceous fuel and a flux, for removing impurities from iron, all finely divided, rotating said kiln slowly about its axis and causing said mixture to flow in a continuous shallow stream along the lowermost inner surface of said cylindrical kiln from the inlet end thereof to a discharge end thereof while heating said kiln by jets containing oxygen directed outward in said kiln against the inner wall thereof and causing combustion of said fuel and reduction of said ore and causing reduction of between forty and seventy-five percent of said ore to iron while controlling the temperature in said kiln between 1800 degrees F. and a point below the sintering temperature of the ore, conducting away from said kiln the CO and $CO_2$ gases generated therein, conducting the stream discharging from said kiln directly to a flash heater and there causing said stream to fall downwardly into molten iron and slag while subjecting said stream to jets containing oxygen, and while maintaining an excess of fuel in said stream sufficient to produce reducing conditions and raising the temperature of said stream to between 2350 degrees F. and 2500 degrees F., while reducing all but twenty to thirty percent of iron ore in said stream to iron, adding at said flash heater iron ore and flux and carbon as indicated by conditions at the discharge end of said rotary reactor, conducting away from said flash heater the CO and $CO_2$ gases generated therein, then feeding said stream into an inlet end of a generally horizontal cylindrical rotary reactor, while applying an oxygen jet to said stream there as desired, and while rotating said reactor about its axis and causing said stream to flow in a continuous shallow stream form under supergravitational forces greater than 6.0 G's in a generally helical path along the radially inner surface of said cylindrical reactor from the inlet end thereof to a discharge end thereof while subjecting said stream form to a purifying flux and jets of oxygen directed outwardly in said reactor against said stream form while burning said fuel in said stream form in a reducing atmosphere and raising the temperature thereof to between 2400 degrees F and 2800 degrees F. while controlling the retention time in said reactor to reduce substantially all of the iron oxides in said stream to iron and carburizing said iron to between three percent and four percent carbon and to leave substantially no excess of carbon at the discharge from said reactor, and conducting away from said rotary reactor the CO and $CO_2$ cases generated therein.

2. The method of reducing solid iron ore particles to hot metallic iron in a continuous system as set forth in claim 1, including the step of feeding fuel into said stream while it is passing through said flash heater.

3. The method of reducing solid iron ore particles to hot metallic iron in a continuous system as set forth in claim 1, including the step of feeding ore into said stream while it is passing through said flash heater.

4. The method of reducing solid iron ore particles to hot metallic iron in a continuous system as set forth in claim 1 including the step of intermittently tilting said rotary reactor to raise the discharge end thereof relative to the inlet end thereof.

References Cited
UNITED STATES PATENTS

| | | | |
|---|---|---|---|
| 3,303,018 | 2/1967 | Goss | 75—52 X |
| 2,526,658 | 10/1950 | Harman et al. | 75—38 |
| 2,986,457 | 5/1961 | Jones | 75—37 |
| 2,919,983 | 1/1960 | Halley | 75—39 X |
| 2,936,230 | 5/1960 | Larsen | 75—52 |
| 1,112,007 | 9/1914 | Hiorth | 75—38 |
| 2,356,524 | 8/1944 | Lohse | 75—40 |
| 2,526,659 | 10/1950 | Harman | 75—38 |
| 3,503,736 | 3/1970 | Sherwood | 75—39 |
| 2,566,548 | 9/1951 | Beauchesne et al. | 75—36 X |
| 2,866,703 | 12/1958 | Goss | 75—52 X |

HENRY W. TARRING II, Primary Examiner

U.S. Cl. X.R.

75—40, 46, 48, 51